United States Patent Office

Re. 24,992

Reissued May 30, 1961

24,992

METHOD OF TREATING FRESH MEATS

Ernest E. Ellies, Wilmette, Ill., assignor to Tee-Pak, Inc., Chicago, Ill., a corporation of Illinois No Drawing. Original No. 2,847,313, dated Aug. 12, 1958, Ser. No. 550,513, Dec. 1, 1955. Application for reissue Aug. 11, 1960, Ser. No. 49,112

8 Claims. (Cl. 99—174)

Matter enclosed in heavy brackets [ ] appears in the original patent but forms no part of this reissue specification; matter printed in italics indicates the additions made by reissue.

This invention relates to the treatment of meat and more particularly, to a method for producing and handling comminuted meat which permits a substantial time lapse to occur between the comminution and the final display of the meat to the ultimate purchaser, without any substantial impairment or loss of the incipient attractive red color and bloom originally possessed by the meat.

The loss of bloom and the undesirable changes in color which meat undergoes with the passage of time are well known and are typically and particularly evident in the case of comminuted meats, such as beef hamburger, which turns bright red shortly after being ground, and then, within a relatively few hours gradually loses this red bloom and becomes less and less attractive.

This undesirable characteristic of meat presents a number of serious problems to the meat merchandiser, as will be illustrated below. For example, in most areas Friday and Saturday are the busiest days of the week for a meat retailer, and in preparing for these periods the butcher ordinarily tries to have as much of the meat chopping, cutting, grinding and so on done in advance so that there will be a minimum of such meat "processing" to be performed on those busy days. It would appear, at first blush, that one of the operations that the butcher himself could and should perform well in advance of the display for sale thereof, would be the grinding up of beef for hamburger. Unfortunately, it has been found and the fact is well known as aforesaid, that hamburger undergoes a rapid, deleterious, irreversible color change with the passage of time and that meat ground on say Thursday night no longer possesses as readily salable a picture of an eye-appealing product on Saturday morning, as does meat ground on Saturday morning.

The problem is likewise a serious one in the case of meat merchandising organizations of the type wherein the bulk of the meat chopping, cutting, grinding and the like is done in a more or less centrally located establishment and the prepared meats, cut, ground and packaged, are transported by trucks to self-service branch stores. In the latter case the present inability to deliver ground beef to a retail store, say a number of days in advance of the sale thereof to the purchaser (without the product losing much of its attractive color and appearance in the interim) presents quite a merchandising problem, and one not satisfactorily solved until the present invention.

Referring to the color changes, loss of bloom and the like which occur in meats after they have been cut, sliced, or ground, it is believed that the various pigments present in meat are effected, color-wise by a number of factors such as the concentration of oxygen in the immediate area of the meat, whether the meat is refrigerated or not, the rate at which transpiration occurs through any covering or wrapping medium that may be placed on or over the meat and the permeability of any such covering or wrapping if any, to oxygen. In any event and whatever the reasons, the phenomena associated with the color changes which occur in meat appear to involve a number of inter-related, obscure, and complex factors.

Thus far, there has been no completely satisfactory technique by which meat, especially comminuted meat, could be stored for commercially important periods of time without loss of the color and bloom which characterizes the "fresh" appearance of say ground beef at its best.

I have discovered a novel method and means by which a comminuted meat product especially ground beef, beef trimmings, stew beef or beef chunks, can be produced and handled without losing its incipient attractive color, bloom, appearance and eye appeal even though the meat may have been comminuted up to several days or longer in advance of its display for sale purposes. In other words, my new process makes it possible for the meat merchandiser to comminute beef for hamburger, or to prepare stew beef, beef chunks, beef trimmings and the like even days ahead of a time when it is to be retailed without loss of its incipient or dormant attractive appearance and desirable organoleptic properties.

In general my novel method involves placing freshly ground meat whether it be in relatively finely comminuted form like hamburger or in the form of coarser particles such as stew beef, beef chunks, beef trimmings and the like, into a tube, bag, pouch, envelope or the like, which may be closed in any one, or a combination of several ways to form an air-tight package the bag or the like being composed of a flexible film material having a predetermined oxygen permeability, and which also has, preferably, certain permeability characteristics with respect to moisture-vapor, nitrogen and carbon dioxide, maintaining the thus encased or packaged meat preferably at refrigerator temperatures, and then, removing the meat from the package shortly prior to display, sale, or preparation for consumption. The meat, on removal from the package, will be found to either have or quickly assume or develop the same or even a greater degree of brightness in color, bloom and appearance, as that which would have developed shortly after its comminution, if such development had not been arrested by enveloping the meat in said bag. Consumer-size packages are, of course, included, in which case it is the housewife who removes the packaging material from the meat, at home, and permits the incipient bloom to develop there.

It is essential in the practice of my invention that the meat be placed in the aforesaid bag, envelope, tube, or the like as soon as possible after it has been comminuted, and in any event before there has been development of full bloom on the surfaces of the comminuted meat. This time-period can readily be determined since when meat, especially beef, is first cut the surface is purplish in color due, it is thought to the presence of reduced hemoglobin. The bright red color which follows the purplish hue first visible after meat is first comminuted or chopped is unmistakable. As pointed out before the meat must be "encased" within the bag, envelope, tube or pouch as soon as possible after grinding but under no circumstances after it has reached its full bloom, which normally occurs 15 to 30 minutes after grinding. Preferably, the container is filled and the open end or ends sealed, tied or clipped to make it "air-tight."

The nature of the bag, envelope, tube, pouch or the like into which the meat, freshly comminuted, is placed is highly important. In the first place, the container must be formed of a flexible film material or a laminate of flexible film materials, and it must have an oxygen permeability ranging from $0.01\times10^{-10}$ to $1.0\times10^{-10}$ and preferably from $0.01\times10^{-10}$ to $0.1\times10^{-10}$ cc.-mm./sec./cm.$^2$/cm. Hg *at 30° C.*, as determined by the techniques referred to in the Journal of Polymer Science 16, 89–91 (1955). Most desirably, the packages are formed from a laminate of two or more films which may, for example, be produced in accordance with the procedure referred to with respect to multi-ply saran film packages in U.S. Patent Nos. 2,679,968 and 2,679,969

The moisture-vapor permeability of saran, one of the preferred materials used in my invention, may be from about $0.40\times10^{-6}$ to $0.60\times10^{-6}$ gm.—cm./sq. cm./24 hr. These values were obtained using Payne permeability cups containing anhydrous calcium chloride. The cups were kept in the isothermal cabinet for nine days at 33° C. and 60 percent relative humidity. The nitrogen and carbon dioxide permeability values of saran as listed in the Journal of Polymer Science 16, 89–91 (1955) were $0.0094\times10^{-10}$ and $0.29\times10^{-10}$ cc./mm./sec. cm.$^2$/cm. Hg *at 30° C.*

The films may be printed or unprinted, and may have printing between the film layers if desired; and the film may be in clear transparent form or may contain filters, dyes, and additives of one kind or another. Adhesives may also be used if desired.

Freshly comminuted meat, when encased or enveloped in a package formed either of single layer or more desirably of multi-ply films made of a copolymer of vinylidene chloride and vinyl chloride, commonly known as saran, or similar film, may be kept at ordinary refrigeration temperatures without loss of its color and bloom properties for a period of time far in excess of the time within which the meat, even when encased in cellophane or what is known in the trade as "fibrous casing" or other packaging materials not having the requisite permeability or other characteristics, turns gray and loses its bloom and its other desired properties.

My discovery is totally unexpected in view of the commonly accepted belief that a wrapping or packaging film in order for the meat to be ideally packaged insofar as color preservation is concerned, should be of the type which has a high oxygen permeability, unlike the flexible film materials required in the practice of my invention.

I have found, in sharp contrast to such widely held views, that used in accordance with my aforesaid method, a film which has low oxygen permeability, such as saran, is surprisingly effective and makes possible for the first time a commercially practical method for producing and handling comminuted meat to meet the numerous exigencies which are intimately associated with the successful merchandising of such a product.

Specific illustrations of the practice and efficacy of my invention are described hereinafter. The described tests point out comparative results obtained particularly with different packaging materials used and illustrate variations in the quality of the hamburger which occur when processed in saran over that processed in other films or types of films.

Specifically, ground beef was packaged in a variety of packaging materials including a "moisture proof" type of cellophane known as cellophane MSAT 80, the non-woven cellulosic product known in the trade as "fibrous casing," saran, a coated regenerated cellulose casing known as CMVP produced in accordance with the teachings of U.S. Patents 2,627,471 and 2,627,483, and "fibrous casing" which had been coated with saran. Tubes of these materials filled with ground beef were stored in a refrigerator held at a temperature of 45° F., plus or minus 3° F., at a relative humidity of 80–85%. The beef had a fat content of approximately 40%, and immediately after grinding was stuffed into tubes of the above packaging materials, each tube having a capacity of about 1 to 1½ pounds.

All of the tubes were securely tied with a cord on both ends to make the package air-tight. Sampling of the product was done on the second, fourth and eighth days of storage and included specifically sampling for the purpose of microbial evaluations, and organoleptic evaluations including color, odor and flavor. Cooked samples, after storage were also prepared and tested.

All of the containers showed some change in weight due to moisture loss, the loss being most severe with the hamburger which was packaged in the fibrous casing, in which the moisture loss was 11.8% after 4 days of storage and progressed to 16.2% after an eight day storage period. The CMVP product showed somewhat better moisture retention properties, but the rate of moisture loss was still significant being 5.8% after four days of storage and 10.4% after an eight day storage period.

Moisture loss in the case of the saran packaged product and the saran coated fibrous product was significantly lower than that of the foregoing products.

The film bacterial count was substantially lower for the saran packaged meat and for the saran coated fibrous product compared to the others.

It was found surprisingly that on inspection of the surface and interior of the hamburger for yeast counts, that not only did the yeast population tend to gradually increase with storage time, which was expected, but that the hamburger contained in the saran or saran-coated fibrous casing had an unaccountably, and significantly, lower yeast count than hamburger packaged in the other materials.

At the eighth day of the storage period all of the hamburger, with the exception of that in the saran tube was objectionable on sight. The meat in the saran coated fibrous casing had a dull brownish grey color. The hamber container in the "fibrous casing" was a very dark reddish purple having a desiccated appearance. So did that in the CMVP.

In sharp contrast to the foregoing it was found that the hamburger packaged in the saran tube had an outstandingly excellent pink appearance throughout the storage period, and that unlike the hamburger packaged in the other films, when the hamburger was removed from the saran package, after a few seconds' exposure to the air it assumed an attractive bright red color. Furthermore, the flavor and odor of the hamburger packaged in the saran tube was superior on the basis of "blind testing" to the others.

While the preferred film for use in practicing my invention is saran, i.e. a copolymer of vinylidene chloride and vinyl chloride other films or film combinations e.g. laminates, having similar physical characteristics, especially oxygen permeability may be used, as for example laminates of saran with itself, with Pliofilm, vinyl, polystyrene, and other multi-ply saran-containing laminates described in U.S. Patent No. 2,679,969, whether secured together by adhesives or by their inherent cling. Furthermore, films coated with saran latex, e.g. polyethylene coated with saran may also be used.

By my invention I have now made it possible, and in a practical commercial, economical way to provide at the retail-level particularly, attractive comminuted beef having a characteristic "fresh" appearance, in contrast to the dull, lifeless, dark brown appearance which ground beef ordinarily assumes on storage, without the absolute requirement of grinding the beef immediately before display. This results in not only offering a more attractive product to the housewife, but is a real advantage to the meat merchandiser to whom the present invention gives an important degree of flexibility in operation.

It will be understood that the foregoing is presented for purpose of illustration only and that the invention is not to be limited to any details or steps except as is required by the claims, since it will be obvious to those skilled in the art that certain advantages in the details and steps are contemplated by the present invention.

I claim:

1. A method for controlling the development of the incipient bloom, color and organoleptic characteristics of comminuted fresh meats which comprises enclosing comminuted fresh meat within about 30 minutes after comminution in a film material which has a permeability of oxygen through said film ranging from about $0.01\times10^{-10}$ to $1.0\times10^{-10}$ cc.-mm./sec./cm.$^2$/cm. Hg *at 30° C.*, a moisture vapor permeability of from about $0.40\times10^{-6}$ to $0.60\times10^{-6}$ gm.—cm./sq. cm./24 hrs., *determined at 33° C. and 60% relative humidity,* maintaining the said comminuted meat in the said film material chilled for a period in excess of that at which unwrapped meat loses a significant part of its red color after comminution, removing the said meat from its encasement in the said film material and mixing the said meat in contact with the atmosphere.

2. The method of claim 1 wherein the meat is beef.

3. The method of claim 1 wherein the film material is made of a copolymer of vinylidene chloride and vinyl chloride.

4. The method of claim 1 wherein the meat is comminuted beef and the film material is a cooplymer of vinylidene chloride and vinyl chloride.

*5. A method for controlling the development of the incipient bloom, color and organoleptic characteristics of comminuted fresh meats which comprises enclosing comminuted fresh meat within about 30 minutes after comminution in a flexible film which has a permeability of oxygen through said film ranging from about $0.01\times10^{-10}$ to $1.0\times10^{-10}$ cc.-mm./sec./cm.$^2$/cm. Hg, at 30° C., maintaining the said comminuted meat in the said film chilled for a period in excess of that at which unwrapped fresh meat loses a significant part of its red color after*

*comminution, and then removing the said meat from its encasement in the said film for exposure to the atmosphere.*

*6. The method of claim 5 wherein the comminuted fresh meat is comminuted fresh beef and the flexible film comprises polyvinylidene chloride.*

*7. The method of claim 5 wherein the meat is beef.*

*8. The method of claim 5 wherein the meat is beef and the film comprises at least one ply of a copolymer of vinylidene chloride and vinylchloride.*

References Cited in the file of this patent
or the original patent

UNITED STATES PATENTS

| | | |
|---|---|---|
| 2,545,243 | Rumsey | Mar. 13, 1951 |
| 2,679,969 | Richter | June 1, 1954 |

OTHER REFERENCES

"Modern Packaging," January 1949, pp. 134 to 137, inclusive, article entitled "Meat-Film Considerations" by Nelson Allen.

"Modern Packaging," September 1951, pp. 122, 123, 174, and 177, article entitled "Meat-Wrapping Technique" by Thomas H. Derby.

"Food Technology," April 1955, pp. 194, 195, and 196, article entitled "Discoloration of Fresh Red Meat and Its Relationship to Film Oxygen Permeability."

Dedication

Reissue No. 24,992.—*Ernest E. Ellies*, Wilmette, Ill. METHOD OF TREATING FRESH MEATS. Patent dated May 30, 1961. Dedication filed Dec. 18, 1974, by the assignee, *Tee-Pak, Inc.*

Hereby dedicates to the Public all of the term of said patent subsequent to Oct. 23, 1974.

[*Official Gazette March 25, 1975.*]